United States Patent
Wilde et al.

(10) Patent No.: US 8,540,914 B2
(45) Date of Patent: *Sep. 24, 2013

(54) TEXTURED SURFACES

(75) Inventors: John Christopher Wilde, Mill Creek, WA (US); Alan D. Oskowski, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 200 days.

This patent is subject to a terminal disclaimer.

(21) Appl. No.: 12/916,989

(22) Filed: Nov. 1, 2010

(65) Prior Publication Data

US 2011/0042000 A1 Feb. 24, 2011

Related U.S. Application Data

(63) Continuation of application No. 11/861,105, filed on Sep. 25, 2007, now Pat. No. 7,824,590.

(51) Int. Cl.
*B29C 33/40* (2006.01)

(52) U.S. Cl.
USPC ........... 264/219; 264/129; 264/130; 264/220; 427/256; 427/280; 427/508; 427/510; 427/511

(58) Field of Classification Search
USPC ......... 264/219, 227, 129, 130, 220; 427/256, 427/280, 508, 510, 511
See application file for complete search history.

(56) References Cited

U.S. PATENT DOCUMENTS

| | | | |
|---|---|---|---|
| 2,991,808 A | | 7/1961 | Murphy et al. |
| 3,674,589 A | * | 7/1972 | Schaab et al. ................. 156/245 |
| 3,735,678 A | | 5/1973 | Smith |
| 3,869,326 A | | 3/1975 | Matzke |
| 3,917,895 A | | 11/1975 | Bosniack |
| 4,483,884 A | | 11/1984 | Troue |
| 4,524,107 A | | 6/1985 | Marchetti et al. |
| 4,656,722 A | | 4/1987 | Armstrong |
| 4,690,845 A | | 9/1987 | Kloss |
| 5,184,307 A | | 2/1993 | Hull et al. |
| 5,976,671 A | | 11/1999 | Gleim |
| 5,985,391 A | * | 11/1999 | Denehy et al. ............... 428/36.6 |
| 6,193,361 B1 | | 2/2001 | Wen |
| 6,488,994 B1 | | 12/2002 | Haller et al. |
| 7,824,590 B2 | | 11/2010 | Wilde et al. |
| 2002/0024479 A1 | | 2/2002 | Palmer et al. |

FOREIGN PATENT DOCUMENTS

| | | |
|---|---|---|
| EP | 1475220 A2 | 11/2004 |
| WO | 9748557 A2 | 12/1997 |
| WO | 03031203 A2 | 4/2003 |

OTHER PUBLICATIONS

European Patent Office, Extended European Search Report for EP Application No. 08164859.4 mailed Jun. 11, 2010, 8 pages.

Office Action, dated Aug. 18, 2009, regarding U.S. Appl. No. 11/861,105, 15 pages.

(Continued)

*Primary Examiner* — Richard Crispino
*Assistant Examiner* — Elizabeth Royston
(74) *Attorney, Agent, or Firm* — Yee & Associates, P.C.

(57) ABSTRACT

One embodiment of a method of manufacturing a textured surface may include providing a first thermally stable sheet, printing a pattern of material on the first sheet to form a three-dimensional textured surface, and curing the material, then using said first sheet to impart negative texture into Tedlar faced epoxy composite blanket, which is in turn used to impart texture into a decorative laminate.

18 Claims, 6 Drawing Sheets

(56) References Cited

OTHER PUBLICATIONS

Final Office Action, dated Jan. 7, 2010, regarding U.S. Appl. No. 11/861,105, 11 pages.

Notice of Allowance, dated Aug. 5, 2010, regarding U.S. Appl. No. 11/861,105, 7 pages.
Notice of Allowance, dated Aug. 19, 2010, regarding U.S. Appl. No. 11/861,105, 8 pages.

* cited by examiner

US 8,540,914 B2

TEXTURED SURFACES

CROSS-REFERENCED TO RELATED APPLICATIONS

This application is a continuation of application U.S. Ser. No. 11/861,105, filed Sep. 25, 2007, now U.S. Pat. No. 7,824,590 issued Nov. 2, 2010.

BACKGROUND INFORMATION

1. Field

This invention relates generally to textured surfaces. More particularly, the invention relates to methods for manufacturing textured surfaces.

2. Background

Many methods exist for manufacturing textured surfaces. One such method utilizes fabricating and/or purchasing steel plates with the desired pattern or texture, and then producing the part using the steel plates having the desired texture. However, this may be costly, time-consuming, inefficient, complex, may limit custom textures, and/or may lead to one or more other types of problems.

A method of manufacturing a textured surface is needed to decrease one or more problems associated with one or more of the existing methods of manufacture.

SUMMARY

In one aspect of the disclosure, a method of manufacturing a textured surface is disclosed. In one step, a first thermally stable sheet is provided. In another step, a pattern of material is printed on the first sheet to form a three-dimensional textured surface on the first sheet. In still another step, the material is cured.

In another aspect of the disclosure, a thermally stable first sheet is provided having a three-dimensional textured surface on the first sheet. The three-dimensional textured surface was formed by printing a pattern of material on the first sheet and curing the material.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
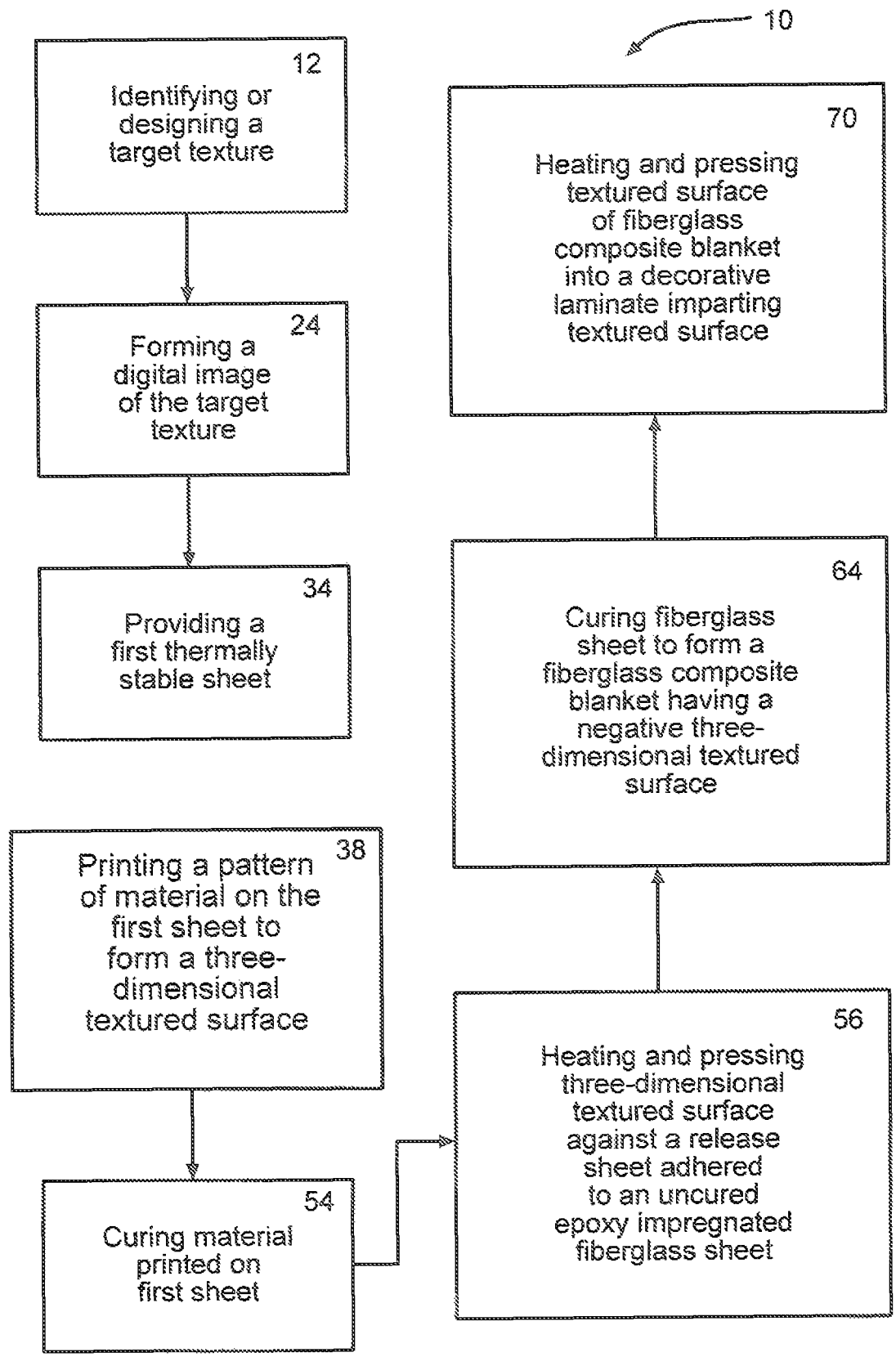
FIG. 1 shows a flowchart of one embodiment of a method of manufacturing a textured surface.
Figure 2:
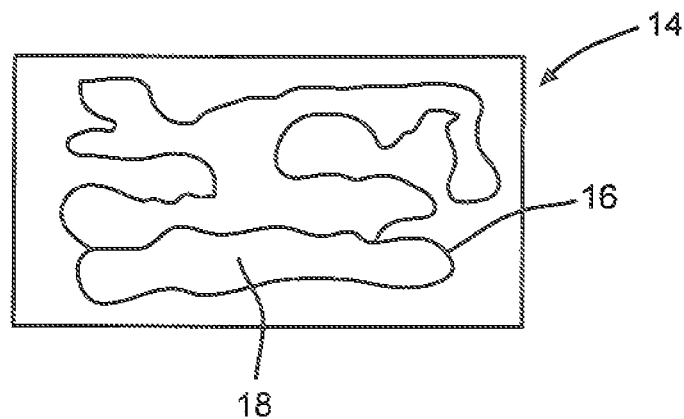
FIG. 2 shows a top-view of one embodiment of a target texture which may be used in the method of the embodiment of FIG. 1.
Figure 3:
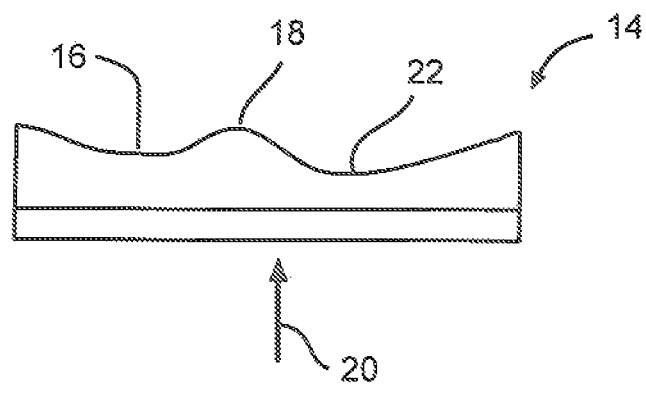
FIG. 3 shows a side-view of the target texture of the embodiment of FIG. 2.

FIG. 1 shows a flowchart of one embodiment of a method 10 of manufacturing a textured surface. In one step 12 of the method 10, a target texture 14, of which a top-view is shown in FIG. 2 and of which a side-view is shown in FIG. 3, may be identified and/or designed. The target texture 14 may comprise a three-dimensional textured pattern 16 with some areas 18 of the pattern 16 protruding in direction 20 more than other areas 22 of the pattern 16 in order to provide a varying textured pattern 16. In other embodiments, the target texture 14 and three-dimensional textured pattern 16 may comprise varying textures of differing uniformity or non-uniformity, differing shapes, differing configurations, differing sizes, differing orientations, or protrusions extending in differing planar or non-planar directions.

Figure 4:
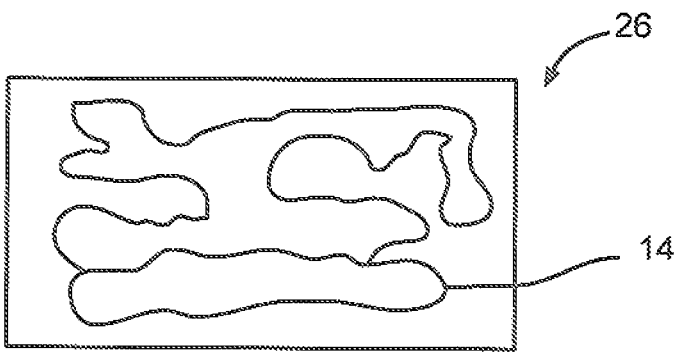
FIG. 4 shows a top-view of one embodiment of a digital image of the target texture of the embodiment of FIG. 2.
Figure 5:
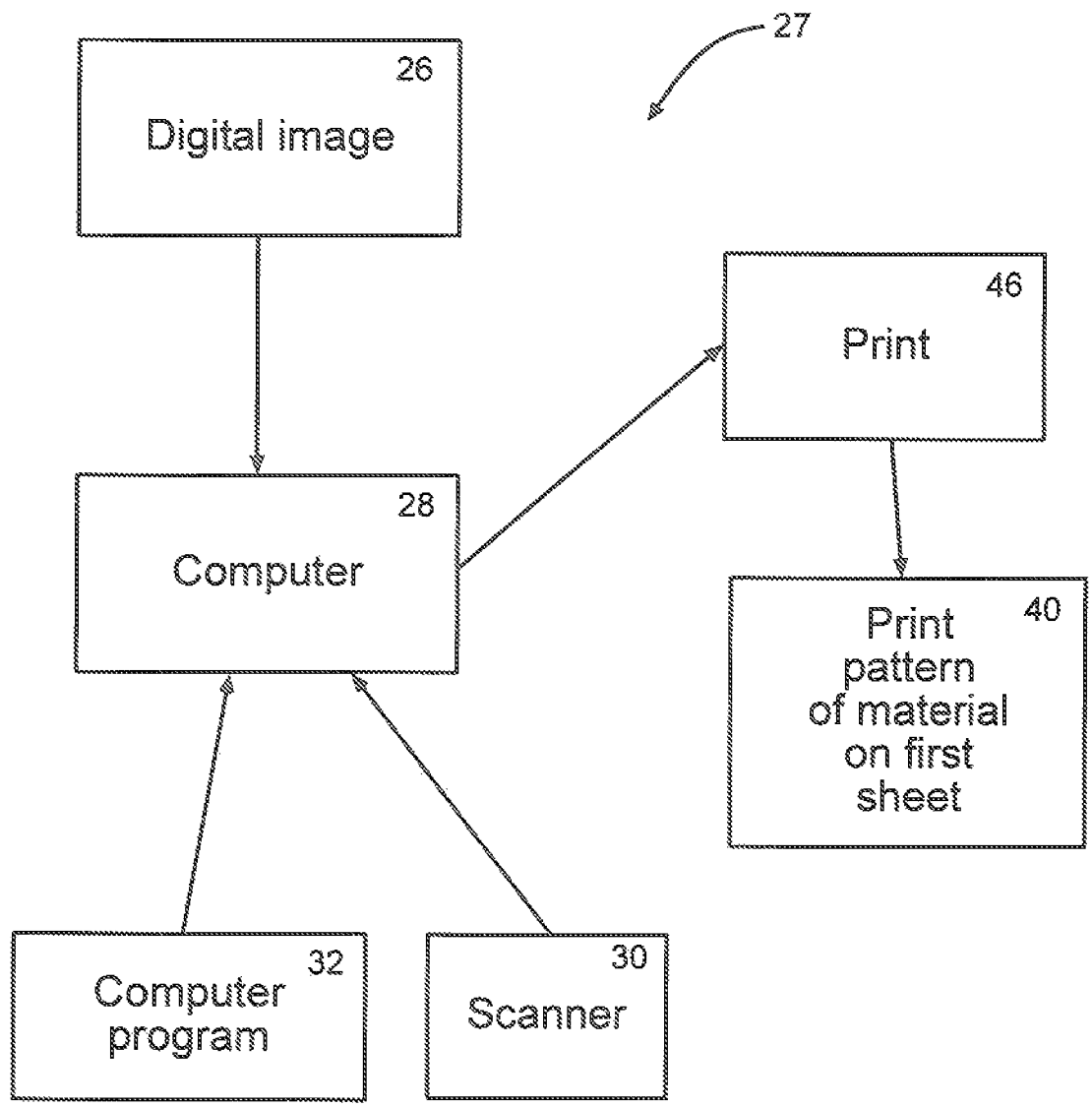
FIG. 5 shows a block chart of equipment which may be used to implement the method of the embodiment of FIG. 1.

In another step 24 of the method 10, a digital image 26, of which a top-view is shown in FIG. 4, may be formed of the target texture 14. FIG. 5 shows a block chart of equipment 27 which may be used to implement the method 10 of FIG. 1. As shown, a computer 28 may be used during step 24 of the method 10 to form the digital image 26. The digital image 26 may comprise scanning the target texture 14 into the computer 28 using a scanner 30. In another embodiment, a computer program 32 on the computer 28 may be used to prepare the digital image 26. In still other embodiments, varying equipment and mechanisms may be used to prepare the digital image 26.

Figure 6:
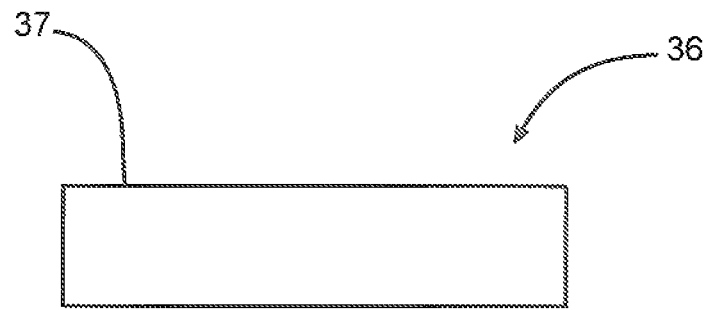
FIG. 6 shows a side-view of a first thermally stable sheet which may be used in the method of the embodiment of FIG. 1.

In another step 34 of the method 10, a first thermally stable sheet 36, of which a side-view is shown in FIG. 6, may be provided. The first thermally stable sheet 36 may comprise a flexible film 37 made of Mylar (biaxially-oriented polyethylene terephthalate or BoPET) or Polyester. In other embodiments, the sheet 36 may comprise varying materials, including non-flexible materials.

Figure 7:
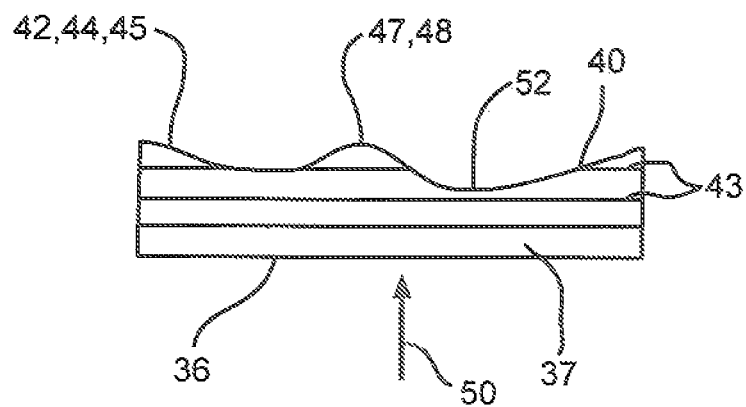
FIG. 7 shows a side-view of the first sheet of the embodiment of FIG. 6 after a pattern of material has been printed on the first sheet.

In another step 38 of the method 10, a pattern 40 of material 42 may be printed on the first sheet 36 to form a three-dimensional textured surface 44 on the first sheet 36, as shown in FIG. 7, which is a side-view of the sheet 36 of FIG. 6 after the pattern 40 has been printed. The three-dimensional textured surface 44 on the first sheet 36 may be formed by printing multiple layers 43 of material 42 on the first sheet 36 with varying amounts of material 42 being printed in differing areas 45 and 47 of the first sheet 36. In another embodiment, only one layer of material 42 may be printed on the first sheet 36. As shown in FIG. 5, a printer 46 connected to computer 28 may be used to print 49 the pattern 40 of material 42 on the first sheet 36.

The three-dimensional textured surface 44 printed on the first sheet 36 may be substantially identical to the target texture 14 inputted into the digital image 26. For instance, some areas 48 of the pattern 40 may protrude in direction 50 in the same amount and direction as areas 18 of the pattern 16 protruding in direction 20 as shown in FIGS. 2 and 3. Similarly, other areas 52 of the pattern 40 may protrude in direction 50 in the same amount and direction as areas 22 of the pattern 16 protruding in direction 20 as shown in FIGS. 2 and 3. In such manner, a varying textured surface 44 may be formed on the first sheet 36. In other embodiments, the three-dimensional textured surface 44 may have a pattern 40 of material 42 in any shape, size, orientation, configuration, uniformity, non-uniformity, or direction. The material 42 used to form the three-dimension textured surface 44 on the first sheet 36 may comprise an ink such as an Ultra Violet Cured ink. In other embodiments, the material 42 may be varied.

Figure 8:
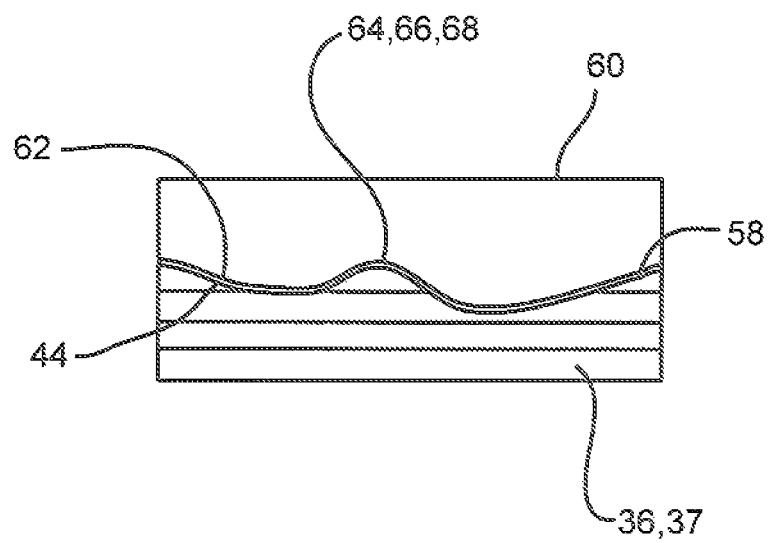
FIG. 8 shows a side-view of the textured surface of the first sheet of the embodiment of FIG. 7 being heated and pressed against a Tedlar release sheet adhered to an uncured epoxy impregnated fiberglass sheet.

In another step 54 of the method 10, the material 42 printed on the first sheet 36 may be cured in order to provide a permanent, rigid, textured surface 44 on the first sheet 36. In still another step 56 of the method 10, the three-dimension textured surface 44 may be heated and pressed against an initially flat Tedlar (polyvinyl fluoride film or PVF film) release sheet 58 adhered to an initially flat uncured epoxy impregnated fiberglass sheet 60 to change the release sheet 58 and the fiberglass sheet 60 to the textured configuration 62 shown in FIG. 8. FIG. 8 is a side-view of the textured surface 44 of the first sheet 36 of FIG. 7 being heated and pressed against the Tedlar release sheet 58 adhered to the uncured epoxy impregnated fiberglass sheet 60 to change the initially flat release sheet 58 and the initially flat fiberglass sheet 60 to the textured configuration 62. In other embodiments, the release sheet 58 and sheet 60 may be formed of varying materials.

Figure 9:
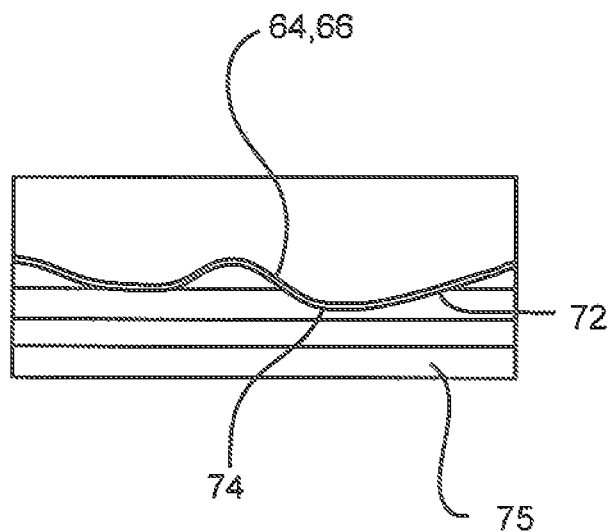
FIG. 9 shows a side-view of a negative three-dimensional textured surface of a cured fiberglass composite blanket being heated and pressed into a decorative laminate to form a three-dimensional textured surface on the decorative laminate.

In step 64 of the method 10, as shown in FIG. 8, the fiberglass sheet 60 may be cured to form a cured fiberglass composite blanket 64 having a negative three-dimensional textured surface 66 which is the inverse image 68 of the three-dimensional textured surface 44 printed on the first sheet 36. During step 70 of the method 10, as shown in FIG. 9, the negative three-dimensional textured surface 66 of the cured fiberglass composite blanket 64 may be heated and pressed into a decorative laminate 72 to form a three-dimensional textured surface 74 on the decorative laminate 72. The three-dimensional textured surface 74 on the decorative laminate 72 may be substantially identical to both the three-dimensional textured surface 44 on the first sheet 36 as shown in FIG. 7 and to the digital image 26 of the target texture 14 as shown in FIG. 4. The decorative laminate 72 may comprise a part of an aircraft 75, such as a decorative interior wall, ceiling, stowage bin, or other decorative portion of an aircraft. In other embodiments, the method 10 may be used to form any type of aircraft part. The composite blanket 64 may be used multiple times to make multiple decorative laminates 72.

In another embodiment, a thermally stable first sheet 36 may be provided having a three-dimensional textured surface 44 on the first sheet 36, as shown in FIG. 7. The three-dimensional textured surface 44 may have been formed by printing a pattern 40 of material 42 on the first sheet 36 and curing the material 42. The material 42 may comprise Ultra Violet Cured ink and the first sheet 36 may comprise a film 37 made of Mylar or Polyester. A target texture 14 may have been identified or designed prior to forming the three-dimensional textured surface 44 on the first sheet 36. A digital image 26 of the target texture 14 may have been formed on a computer 28 by scanning the target texture 14 into the computer 28 or using a computer program 32 to prepare the digital image 26. Multiple layers 43 may have been printed on the first sheet 36 to form the three-dimensional textured surface 44 on the first sheet 36.

The first sheet 36 may be for heating and pressing the three-dimensional textured surface 44 against a release sheet 58 adhered to an uncured epoxy impregnated fiberglass sheet 60 in order to form a composite blanket 64 having a negative three-dimensional textured surface 66 which is the inverse image 68 of the three-dimensional textured surface 44 on the first sheet 36. The composite blanket 64 may be for heating and pressing the negative three-dimensional textured surface 66 of the composite blanket 64 into a decorative laminate 72 to form a three-dimensional textured surface 74 on the decorative laminate 72 which is substantially identical to the three-dimensional textured surface 44 on the first sheet 36. The decorative laminate 72 may be a part of an aircraft.

One or more embodiments of the disclosure may allow for the production of decorative laminates 72 using a process which is more efficient, less timely, less time-consuming, less complex, allows for more varied types of decorative laminates 72 to be produced, and/or provides one or more other types of improvements over one or more of the existing methods. For instance, the tooling of the disclosure may comprise inexpensive film and cured ink, and the production process may take only hours as opposed to months under one or more of the existing methods.

Figure 10:
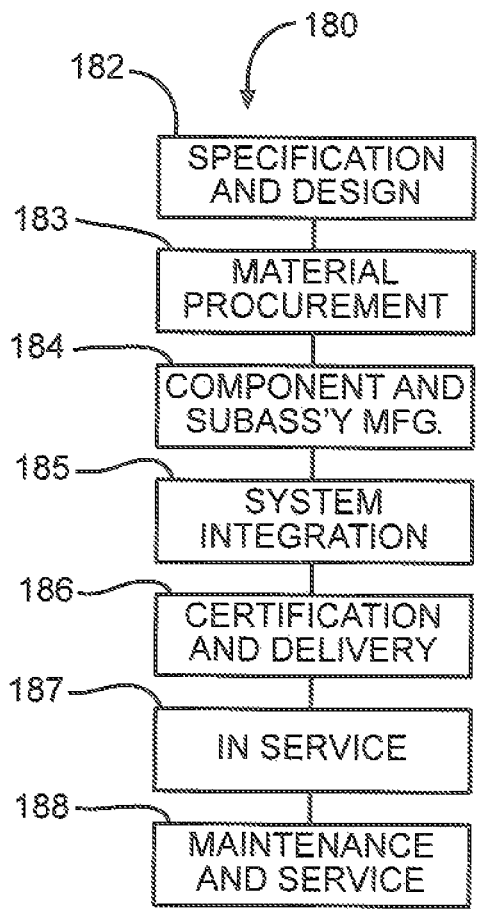
FIG. 10 is a flow diagram of aircraft production and service methodology.
Figure 11:
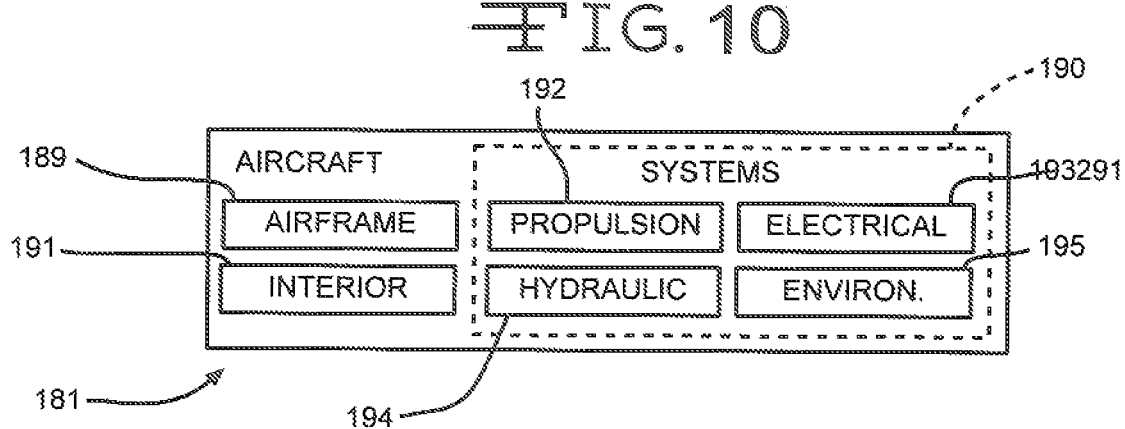
FIG. 11 is a block diagram of an aircraft.

Referring more particularly to the drawings, embodiments of the disclosure may be described in the context of an aircraft manufacturing and service method 180 as shown in FIG. 10 and an aircraft 181 as shown in FIG. 11. During pre-production, exemplary method 180 may include specification and design 182 of the aircraft 181 and material procurement 183. During production, component and subassembly manufacturing 184 and system integration 185 of the aircraft 181 takes place. Thereafter, the aircraft 181 may go through certification and delivery 186 in order to be placed in service 187. While in service by a customer, the aircraft 181 is scheduled for routine maintenance and service 188 (which may also include modification, reconfiguration, refurbishment, and so on).

Each of the processes of method 180 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 11, the aircraft 181 produced by the exemplary method 180 may include an airframe 189 with a plurality of systems 190 and an interior 191. Examples of high-level systems 190 include one or more of a propulsion system 192, an electrical system 193, a hydraulic system 194, and an environmental system 195. Any number of other systems may be included. Although an aerospace example is shown, the principles of the invention may be applied to other industries, such as the automotive industry.

Apparatus and methods embodied herein may be employed during any one or more of the stages of the production and service method 180. For example, components or subassemblies corresponding to production process 184 may be fabricated or manufactured in a manner similar to components or subassemblies produced while the aircraft 181 is in service. Also, one or more apparatus embodiments, method embodiments, or a combination thereof may be utilized during the production stages 184 and 185, for example, by substantially expediting assembly of or reducing the cost of an aircraft 181. Similarly, one or more apparatus embodiments, method embodiments, or a combination thereof may be utilized while the aircraft 181 is in service, for example and without limitation, to maintenance and service 188.

It should be understood, of course, that the foregoing relates to exemplary embodiments of the disclosure and that modifications may be made without departing from the spirit and scope of the disclosure as set forth in the following claims.

What is claimed is:

1. A method of manufacturing a textured surface comprising:
   providing a first sheet;
   printing a pattern of material on the first sheet to form a three-dimensional textured surface on the first sheet;
   curing the three-dimensional textured surface;
   heating and pressing the three-dimensional textured surface against a second sheet, the second sheet comprising a polyvinyl fluoride film release sheet adhered to an uncured composite sheet;
   curing the second sheet to form a negative three-dimensional textured surface; and heating and pressing the negative three-dimensional textured surface of the cured second sheet against a decorative laminate to form a second three-dimensional textured surface on the decorative laminate.

2. The method according to claim 1 wherein the first sheet comprises a thermally stable sheet.

3. The method according to claim 1 wherein the uncured composite comprises an epoxy impregnated fiberglass sheet.

4. The method according to claim 1 wherein the second three-dimensional textured surface on the decorative laminate is substantially similar in shape to the three-dimensional textured surface.

5. The method according to claim 1 further comprising the step of forming a digital image of a target texture, and wherein the step of printing a pattern of material on the first sheet further comprises printing a pattern of material on the first sheet to form a three-dimensional textured surface on the first sheet wherein the pattern of material is based on the digital image of the target texture.

6. The method according to claim 1 wherein the step of printing a pattern of material on the first sheet further comprises printing multiple layers of material on the first sheet so as to form the pattern of material.

7. The method according to claim 1 wherein the first sheet comprises a film.

8. The method according to claim 7 wherein the film comprises one of biaxially-oriented polyethylene terephthalate and polyester.

9. The method according to claim 1 wherein material is an ultra violet cured ink.

10. The method according to claim 1 wherein the decorative laminate comprises an aircraft component.

11. A method of manufacturing a textured surface comprising:
    printing a pattern of material on a first sheet to form a three-dimensional textured surface on the first sheet, wherein the pattern of material is based on a digital image of a target texture; curing the three-dimensional textured surface;
    pressing the three-dimensional textured surface against a release sheet adhered to an uncured composite, the release sheet comprising a polyvinyl fluoride film;
    curing the release sheet adhered to the uncured composite to form a negative three-dimensional textured surface; and
    pressing the negative three-dimensional textured surface of the cured composite against a component to form a second three-dimensional textured surface on the component.

12. The method according to claim 11 wherein the uncured composite comprises an epoxy impregnated fiberglass sheet.

13. The method according to claim 11 wherein the step of pressing the three-dimensional textured surface against a second sheet further comprises heating and pressing the three-dimensional textured surface against a second sheet.

14. The method according to claim 11 wherein the step of pressing the negative three-dimensional textured surface of the cured composite sheet further comprises heating and pressing the negative three-dimensional textured surface of the cured composite sheet.

15. The method according to claim 11 wherein the second three-dimensional textured surface on the decorative laminate is substantially similar in shape to the three-dimensional textured surface.

16. The method according to claim 11 further comprising the step of forming a digital image of a target texture.

17. A method of manufacturing a textured surface comprising:
    digitally imaging a target texture so as to create a digital image of the target texture;
    printing a pattern of material on a first sheet to form a three-dimensional textured surface on the first sheet wherein the pattern of material is based on the digital image of the target texture;
    curing the three-dimensional textured surface;
    pressing the three-dimensional textured surface against a polyvinyl fluoride film release sheet adhered to an uncured composite sheet;
    curing the composite sheet to form a negative three-dimensional textured surface; and
    pressing the negative three-dimensional textured surface of the cured composite sheet against a component to form a second three-dimensional textured surface on the component.

18. The method according to claim 17 wherein the step of pressing the three-dimensional textured surface against a composite sheet further comprises heating and pressing the three-dimensional textured surface against a composite sheet, and wherein the step of pressing the negative three-dimensional textured surface further comprises heating and pressing the negative three-dimensional textured surface.

* * * * *